(12) United States Patent
Cook et al.

(10) Patent No.: US 7,668,857 B2
(45) Date of Patent: Feb. 23, 2010

(54) META-DATA TAGS USED TO DESCRIBE DATA BEHAVIORS

(75) Inventors: Jonathan Michael Cook, Austin, TX (US); Randy Allan Rendahl, Raleigh, NC (US); David G. Robinson, Cary, NC (US); Shaw-Ben Shi, Austin, TX (US); Lorraine Phyllis Vassberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/268,989

(22) Filed: Nov. 7, 2005

(65) Prior Publication Data

US 2007/0112825 A1    May 17, 2007

(51) Int. Cl.
*G06F 7/00* (2006.01)
*G06F 3/00* (2006.01)
*G06F 15/173* (2006.01)
(52) U.S. Cl. .................... 707/102; 719/313; 709/242
(58) Field of Classification Search ............... 707/102, 707/104.1, 101, 200; 709/201, 207, 242, 709/223; 719/313
See application file for complete search history.

(56) References Cited

U.S. PATENT DOCUMENTS

| 7,024,462 | B1* | 4/2006 | McErlean ................... 709/207 |
|---|---|---|---|
| 7,313,575 | B2* | 12/2007 | Carr et al. ................. 707/104.1 |
| 2002/0065822 | A1* | 5/2002 | Itani ............................. 707/7 |
| 2004/0143598 | A1* | 7/2004 | Drucker et al. ............ 707/104.1 |
| 2005/0010660 | A1* | 1/2005 | Vaught ........................ 709/223 |
| 2005/0278731 | A1* | 12/2005 | Cameron et al. ............... 725/14 |
| 2006/0230244 | A1* | 10/2006 | Amarendran et al. ......... 711/162 |
| 2006/0280181 | A1* | 12/2006 | Brailas et al. ................ 370/392 |
| 2006/0294396 | A1* | 12/2006 | Witman et al. ............... 713/189 |
| 2007/0113287 | A1* | 5/2007 | Blumenau et al. ............. 726/26 |

\* cited by examiner

*Primary Examiner*—Tony Mahmoudi
*Assistant Examiner*—MD. I Uddin
(74) *Attorney, Agent, or Firm*—Yee & Associates, P.C.; Jeffrey S. LaBaw

(57) ABSTRACT

A computer implemented method, apparatus, and computer usable program code to aggregate data. Data is parsed for a behavior tag assigned to a portion of the data. In response to detecting a behavior tag, a determination is made as to whether a policy is associated with the behavior tag. The policy associated with a behavior tag defines how the portion of the data assigned to the behavior tag is to be aggregated. The portion of the data is aggregated using the policy associated with the behavior tag.

20 Claims, 7 Drawing Sheets

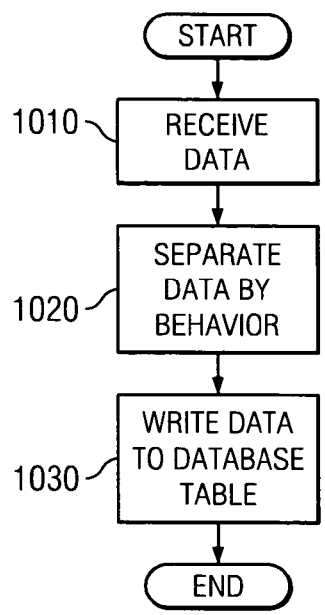
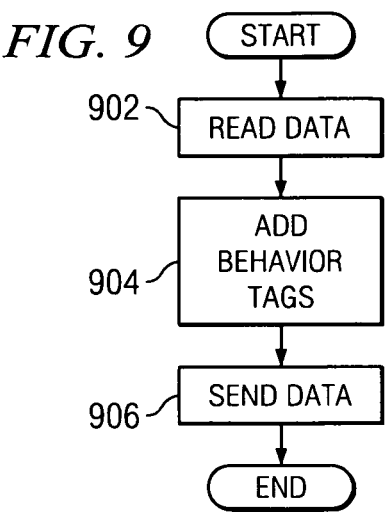
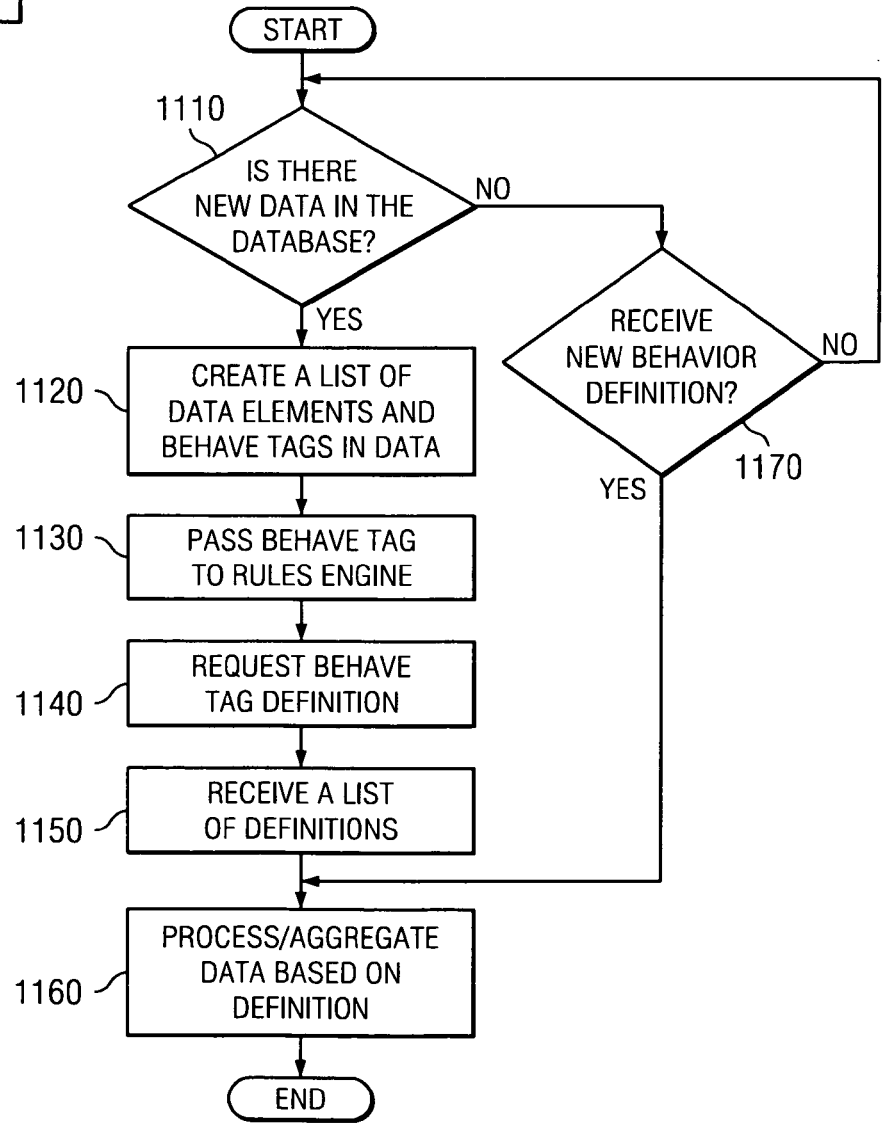

FIG. 12

```
Begin Loop 1:
    Check database table for new data         ⎫
    If new data found                         ⎬ 1210
    {                                         ⎭
        Build list of data elements and related behave tags in new data
        Begin Loop 2:
            Contact rules engine for data element i, pass behave tag,
                and other relevant information Accept information back from rules engine on processing to    ⎫
                perform on data element.                                  ⎬ 1220

Perform processing on data element based on information       ⎭
                from rule engine. (hourly, daily, weekly, etc)
        End Loop 2;
    }
    Sleep
End Loop 1;
```

FIG. 13

```
Begin Loop 1:
    Wait to be contacted by an aggregation process
    Receive data from aggregation process (includes behave tag and
        other relevant data)
            Consult "definition" that describes actions to take for
                behave tag.
            "Temper" list of definitions based on other information
                passed by aggregation program (for example, if
                millions of records, skip the standard deviation
                calculation listed in the definitions.)
            Return "tempered" list to aggregation program
End Loop 1;
.....
```
1300

FIG. 14

```
Begin Loop 2:
    Wait for human change to behave tag definition(s)
    Receive behave tag definition change.
    Contact aggregation process and inform of new actions to take
        based on new behavior definition.
End Loop 2;
```
1400

META-DATA TAGS USED TO DESCRIBE DATA BEHAVIORS

BACKGROUND OF THE INVENTION

1. Field of the Invention

The present invention relates generally to an improved data processing system and in particular, to a method, computer program product and system for describing data. Still more particularly, the present invention relates a computer implemented method, computer usable program code and system for utilizing meta-data tags to describe data behaviors.

2. Description of the Related Art

Computer programs exchange data for a variety of purposes. In order for one computer program to understand the context and meaning of a particular piece of data exchanged with another computer program, descriptive information about each piece of data is often exchanged along with the data. Data describing other data in this manner is sometimes referred to as meta-data.

To standardize meta-data tags to identify pieces of data, a common approach is to create specific meta-data labels. Labels in meta-data are used to describe the type and format of data. Each meta-data label has a specific meaning and prescribes a format for that data.

In addition, some industries have developed standard meta-data labels to be used in their industry and have promoted these standard meta-data labels with the International Organization for Standards (ISO).

Meta-data labels and/or meta-data documents can be used to describe data content, which relates to what the object or data element contains; the data context, which indicates the who, what, why, where, and how aspects associated with the creation of the object or data element; and data structure, which relates to the formal set of associations within or among individual information objects.

When a new meta-data label needs to be added to data to describe either new pieces of data or to add an additional description to an existing piece of data, existing documents containing the data must be updated to include the new label. This process typically involves modifying the sending program to include the new meta-data label in the exchanged document containing the data. In addition, the receiving program may have to be updated to interpret and handle the new meta-data label.

Thus, describing new data or adding an additional description to existing data utilizing meta-data labels with specific standardized meanings requires a user to modify existing data exchange documents, modifying the sending program to add a new meta-data label, and updating receiving programs to handle the new meta-data label. Therefore, it would be advantageous to have a computer implemented method, apparatus, and computer usable program code using meta-data tags to describe data behaviors without modifying the sending program or any of the existing exchanged documents.

SUMMARY OF THE INVENTION

The aspects of the present invention provide a computer implemented method, apparatus, and computer usable program code to aggregate data. Data is parsed for a behavior tag assigned to a portion of the data. In response to detecting a behavior tag, a determination is made as to whether a policy is associated with the behavior tag. The policy associated with a behavior tag defines how the portion of the data assigned to the behavior tag is to be aggregated. The portion of the data is aggregated using the policy associated with the behavior tag.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart outlining an exemplary operation of the present invention when data provider processes data in accordance with an illustrative embodiment of the present invention;

FIG. 10 is a flowchart outlining an exemplary operation of the present invention when data receiver processes data in accordance with an illustrative embodiment of the present invention;

FIG. 11 is a flowchart outlining an exemplary operation of the present invention when data aggregator processes data in accordance with an illustrative embodiment of the present invention;

FIG. 12 is an exemplary illustration of pseudocode logic in an aggregation process in accordance with an illustrative embodiment of the present invention;

FIG. 13 is an exemplary illustration of pseudocode logic in accordance with an illustrative embodiment of the present invention; and FIG. 14 is an exemplary illustration of pseudocode logic in a rules process when a behavior tag definition is changed in accordance with an illustrative embodiment of the present invention.

DETAILED DESCRIPTION OF THE PREFERRED EMBODIMENT

Figure 1:
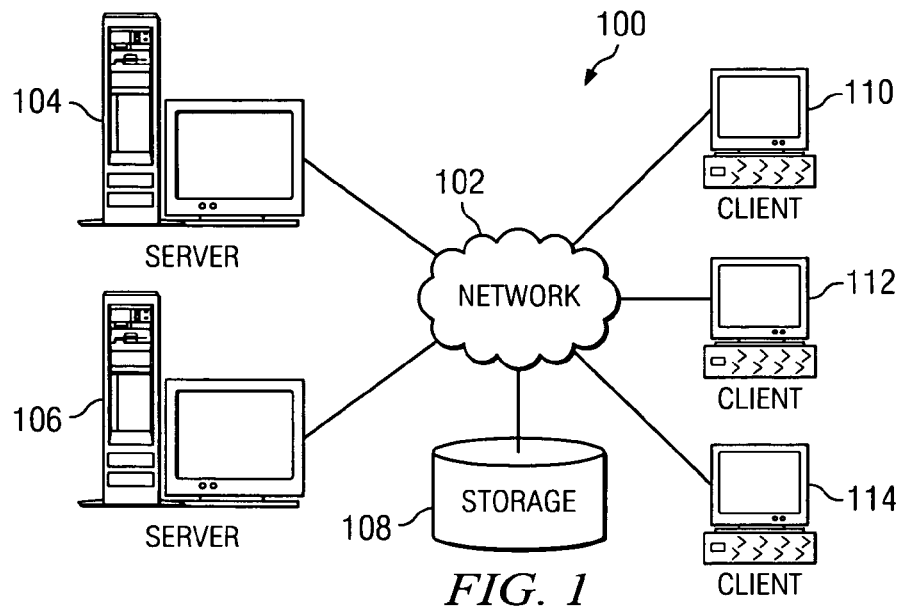
FIG. 1 is a pictorial representation of a network of data processing systems in which aspects of the present invention may be implemented.
Figure 2:
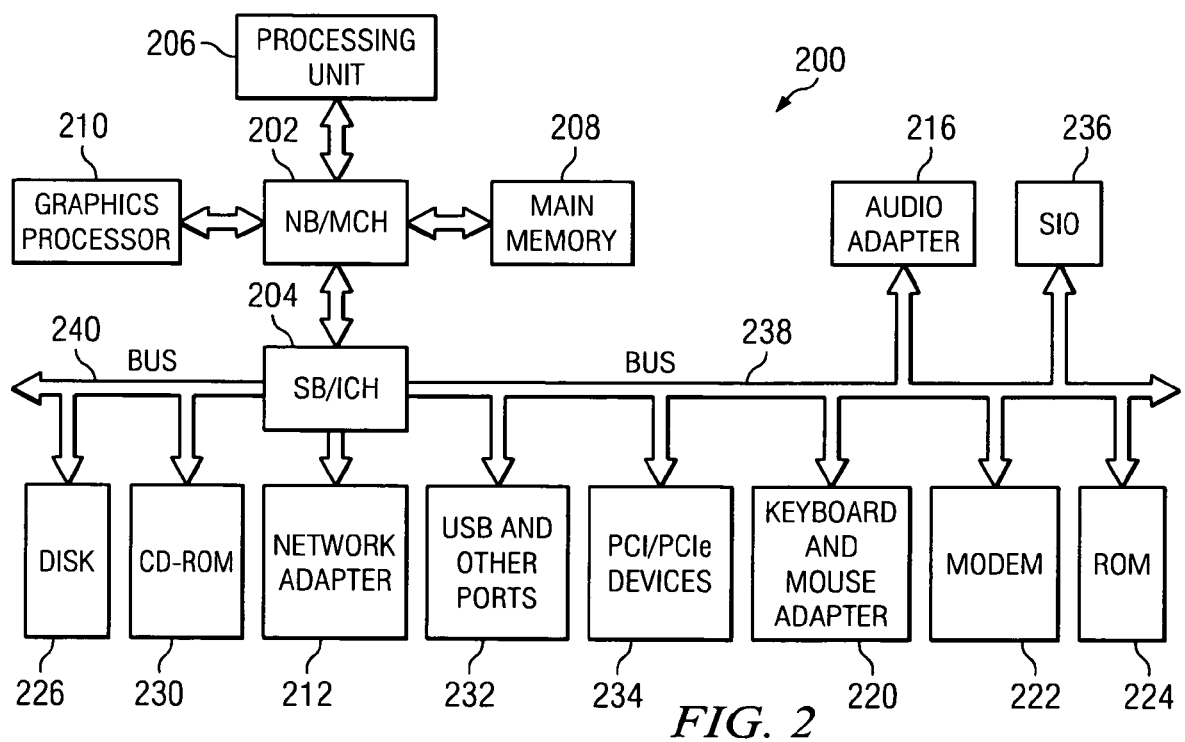
FIG. 2 is an exemplary block diagram of a data processing system in which aspects of the present invention may be implemented.

FIGS. 1 and 2 are provided as exemplary diagrams of data processing environments in which embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data to clients 110, 112, and 114. Network data processing system 100 may include additional servers, clients, and other devices not shown.

Clients 110, 112, and 114 provide data elements to servers 104 and 106. Servers 104 and 106 write data elements to storage 108. Servers 104 and 106 also retrieve data elements from storage 108.

In the depicted example, network data processing system 100 is the Internet with network 102 representing a worldwide collection of networks and gateways that use the Transmission Control Protocol/Internet Protocol (TCP/IP) suite of protocols to communicate with one another. Any protocol could be used in accordance with the aspects of the present invention to transmit data.

At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1 and 2 and above-described examples are not meant to imply architectural limitations. For example, data processing system 200 also may be a tablet computer, laptop computer, or telephone device in addition to taking the form of a PDA.

The aspects of the present invention provide an improved computer implemented method, apparatus, and computer usable program code for describing data behaviors using meta-data tags. During a data exchange, a sending program sends data to a receiving program along with a meta-data behavior (BEHAV) tag to the receiving program. A behavior tag includes a sub-tag. A policy is associated with each sub-tag in the behavior tag. The policy defines how the portion of the data assigned to the behavior tag is to be aggregated. Data received by the receiving program is aggregated according to a policy associated with the behavior tag describing operations to be performed on exchanged data.

In these examples, the policy is a set of behavior rules. This policy also may include any other data or parameters in addition to the set of behavior rules that can be used to interpret how the meta-data tags are to be aggregated.

The policy is user configurable. User can modify the policy associated with the behavior tag without modifying an existing exchanged document or the sending program. This is accomplished by modifying the policy associated with the behavior tag for the receiving program. The meta-data tags that are placed into transmitted data do not have to be changed or modified in order to change the way the data is aggregated and/or displayed by a receiving program. How the portion of data is aggregated and/or displayed changes when the policy changes.

In other words, the data element characterization specifying how the data element is aggregated and/or displayed can be changed without modifying the sending program or existing exchanged documents. In this manner, two different receiving programs receiving the same data and meta-data tags can aggregate and/or display the data in a different manner based on a different policy associated with the meta-data tag for each receiving program. In some cases, the receiving program may require modification to look for and interpret the policy associated with the meta-data tags.

Figure 3:
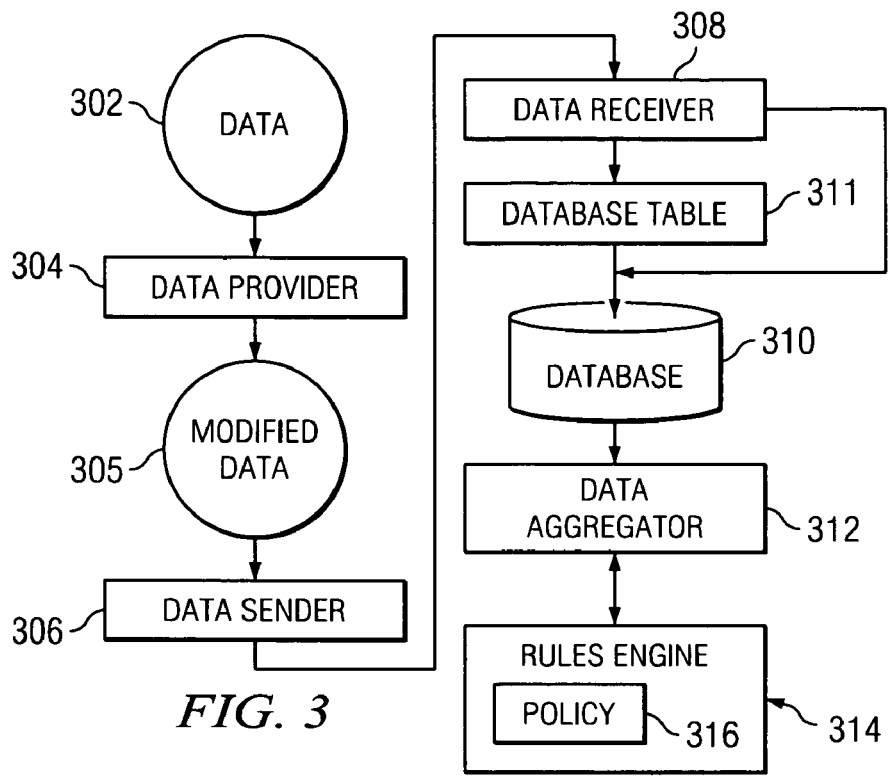
FIG. 3 is an exemplary block diagram illustrating the processing of data in accordance with an illustrative embodiment of the present invention.

FIG. 3 depicts an exemplary block diagram illustrating the processing of data 302 in accordance with an illustrative embodiment of the present invention. As used herein, processing of data includes aggregating data. Data 302 may be any type of data capable of being collected by data provider 304. Data 302 is comprised of data elements in these examples. A data element is a particular piece of data.

A data provider, such as data provider 304, collects data. In the illustrative example, data provider 304 is a program run on a computer that collects various pieces of data. A data provider can be preprogrammed to collect a certain set of data elements. The type of data elements collected by data provider 304 depends upon the type of environment in which data provider 304 is used.

For example, if a data provider is used with an operating system, the data provider can collect data elements for different parameters. These parameters include, for example, the amount of memory used by the operating system, the percentage of time the processor is busy, or the amount of free disk space. If data provider 304 is used in conjunction with a database, the data provider can collect data elements, such as the amount of log space available for a database or the number of clients connected to the database. On a Web server, data provider 304 can collect data elements for parameters, such as, for example, the number of connections to a web page, the number of requests for a certain web page, or the time required for serving a web page to a client.

Data provider 304 can temporarily store collected data in a flat file, a database, or any other storage mechanism. Data provider 304 can also transmit data to a data sender as soon as the data is collected and modified, rather than store the data prior to transmission.

Data provider 304 assigns a behavior tag to a portion of data to form modified data 305. A behavior tag is a construct used for labeling and classifying data based on how the data will be processed and/or displayed. A behavior tag is used to identify a piece of data with behaviors. A behavior tag is inserted into data as a BEHAV tag and one or more sub-tags. Modified data 305 is data that includes behavior tag(s).

In these examples, a behavior tag includes one or more sub-tags. A Sub-tag is assigned to a behavior tag to characterize the behavior of the piece of data associated with the behavior tag. The sub-tag indicates operations to be performed on data and/or the manner in which data is displayed. In other words, data associated with a behavior tag is processed and displayed in accordance with the operations defined for the sub-tag. For example, a PEAK sub-tag can characterize data for determining/displaying a peak value. A GAUGE sub-tag can characterize data to be displayed on a gauge-like display.

In an embodiment of the present invention, a behavior tag includes a single sub-tag. In another embodiment of the present invention, a behavior tag includes a plurality of sub-tags. In another embodiment of the present invention, a behavior tag does not include any sub-tags.

When the data provider is programmed and configured to collect a specific set of data elements, data provider is also programmed with the specific set of behavior tags specified for each data element. The data provider maps behavior tags to data in accordance with the specified set of behavior tags.

Data provider mapping of behavior tags to behavior elements can be made configurable by a user. In one embodiment of the present invention, the mapping of a specified data element to a particular behavior tag is hard coded into a data template. As the data provider collects data elements, data provider fills out a pre-existing data template. In other words, data provider has a check list of data elements to be collected. The data template includes the behavior tag to use for each particular data element. The data provider assigns a behavior tag to each data element in accordance with the data template.

A receiving program, such as data receiver 308, receives data and behavior tags from a sending program, such as data sender 306. Data receiver interprets a behavior tag and sub-tags based on a policy, such as a set of rules, defined for the behavior tag and sub-tags. A policy is associated with the sub-tag in the behavior tag. The policy for the behavior tag is a behavior tag definition created by a user. The behavior tag definition for a particular behavior tag describes a behavior of data. In other words, the behavior tag definition defines an operation to be performed on data associated with the particular behavior tag.

A data aggregator, such as data aggregator 312, processes a data element based on the behavior tag definition for the behavior tag associated with the data element. For example, the behavior tag and sub-tag "BEHAV PEAK" policy could include a behavior tag definition specifying an operation to find a maximum or peak value for data associated with the behavior tag and sub-tag "BEHAV PEAK" and displays that value on a display.

The behavior tag definition is provided to a data aggregator by a rules engine, such as rules engine 314. A data aggregator provides information to a rules engine that might affect the type of calculations or operations that should be performed on data. For example, the data aggregator can provide information to the rules engine regarding the amount of data available and database conditions. If a resource intensive calculation is required for a particular operation, it may be desirable to delay processing of the data during certain times of the day when processing resource demands are greater.

For example, the data aggregator can provide the rules engine with relevant information regarding the total number of data records waiting to be processed, the time of day on the machine where data aggregator runs, and the number of data providers reporting new data. The data aggregator may also provide data aggregator identification information if multiple data aggregators are running simultaneously. In such a case, different data aggregators can be configured to perform a subset of operations for a behavior tag.

A rules engine can use the information provided by the data aggregator to create a tempered list of behavior tag definitions in accordance with an embodiment of the present invention. A tempered list of behavior tag definitions means that the behavior tag definition is adjusted or attuned by adding a counterbalancing element. For example, if the complete definition of a behavior sub-tag includes the following operations: MIN (minimum), MAX (maximum), AVG (average), and STD (standard deviation), but the data aggregator identification information indicates that this particular data aggregator is not configured to perform standard deviation calculation, then the list of definitions returned to data aggregator may be tempered to include MIN, MAX, and AVG only.

In the illustrative example, data provider 304 collects data 302. Data provider 304 also assigns a behavior tag to a portion of data 302 forming modified data 305. A portion of data is defined to include a part of the data, or all of the data. Modified data 305 is handed to data sender 306 by data provider 304.

Data sender 306 is a sending program for sending the data and the behavior tag to a receiving program. Data sender 306 receives modified data from data provider 304 and transmits data to data receiver 308. In other embodiments of the present invention, the data sender sends the data and behavior tag to a data aggregator. Creating and implementing a sending program to transmit data to a receiving program is known in the prior art.

Data receiver 308 is a receiving program for receiving transmitted data from a sending program. Data may be exchanged between a data receiver and a data sender utilizing any method of exchange, including document exchange, asynchronous messages, or remote procedure calls.

In one illustrative embodiment of the present invention, data is exchanged between a sending program and a receiving program utilizing an exchanged document. The exchanged document can be in any format, including binary, ASCII, and UTF-8. The document may also have any internal structure, including relative positioning and XML schema. In one embodiment, an exchanged document using an XML-like tag language is utilized.

Data receiver 308 writes data 305 to database 310. In one embodiment of the present invention, data receiver can separate data by behavior in accordance with the meta-data behavior tag before it is written to database 310 by utilizing one or more database tables, such as database table 311, to separate data.

In this example, database table 311 is a logical structure consisting of rows and columns. All data elements can be written to a single large database table. Each data element in the database is a separate column in database table 311. Database table 311 may also consist of several smaller database tables.

The decision as to where to write data is influenced by the type of behavior tags included in the data. Data containing certain sets of behavior tags are written to one database table while data containing a different set of behavior tags can be written to a different database table. For example, data containing a behavior tag that indicates only a simple operation, such as an operation to find an average, is written to one database table. Data containing another behavior tag that requires a complex operation, such as operations to find a standard deviation and perform a regression analysis, is written to a separate database table so that data can be processed separately from the other data elements.

Data aggregator 312 reads data from database 310. When data aggregator 312 detects new data in the database, data aggregator parses data for a behavior tag assigned to a portion of the data. In response to detecting a behavior tag assigned to a portion of the data, data aggregator requests a policy for the behavior tag from rules engine.

The rules engine makes a determination as to whether a policy is associated with the behavior tag. The policy associated with a behavior tag defines how the portion of the data assigned to the behavior tag is to be aggregated. The data aggregator aggregates the portion of the data assigned to the particular behavior tag using the policy associated with that behavior tag.

The rules engine determines whether a policy is associated with a particular behavior tag by checking a rules database for a set of behavior rules associated with the behavior tag for the portion of data, such as modified data 305. The rules engine provides the policy to the data aggregator.

When data aggregator 312 makes the request for a policy, data aggregator 312 provides rules engine 314 with the behavior tag and other additional relevant information. Data aggregator 312 consults with rules engine 314 regarding the set of rules for behavior tag definition for a particular behavior tag that describes the operations to perform on data associated with that behavior tag. Rules engine 314 may automatically temper the behavior tag definition returned to data aggregator 312 based on the additional relevant information provided to rules engine 314 by data aggregator 312.

Data aggregator 312 processes and/or displays data based on the policy for the meta-data behavior tag received from rules engine 314. Behavior tags describe concrete or abstract behaviors of data 302. The behavior tag identifies a data element with behaviors. The behavior tag includes one or more characterization sub-tags that characterize how a data element will be processed and/or displayed in accordance with a definition for the behavior tag in rules engine 314.

A sub-tag characterization of data is dependent upon policy 316 defined for the sub-tag in a set of rules stored in rules engine 314. Upon receiving data and behavior tag, data aggregator 312 will process data 305 in accordance with the current set of rules defined for the behavior tag and sub-tag provided by rules engine 314. Processing of a data element in accordance with a policy includes, for example, aggregating data, performing mathematical operations on data, sorting data, classifying data, categorizing data, or any other method of processing and/or displaying data.

In an embodiment of the present invention, a behavior tag can include a plurality of sub-tags. When a data aggregator detects a behavior tag that includes a plurality of sub-tags, the data aggregator makes a determination as to whether a policy is associated with respective ones of the plurality of sub-tags of the behavior tag. Each policy associated with the respective sub-tags of the plurality of sub-tags defines how the portion of data assigned to the behavior tag is to be processed. The portion of data is processed using at least one policy associated with a sub-tag of the behavior tag. For example, if one policy associated with a sub-tag in the plurality of sub-tags is an aggregation policy, the portion of data will be aggregated using that aggregation policy.

Figure 4:
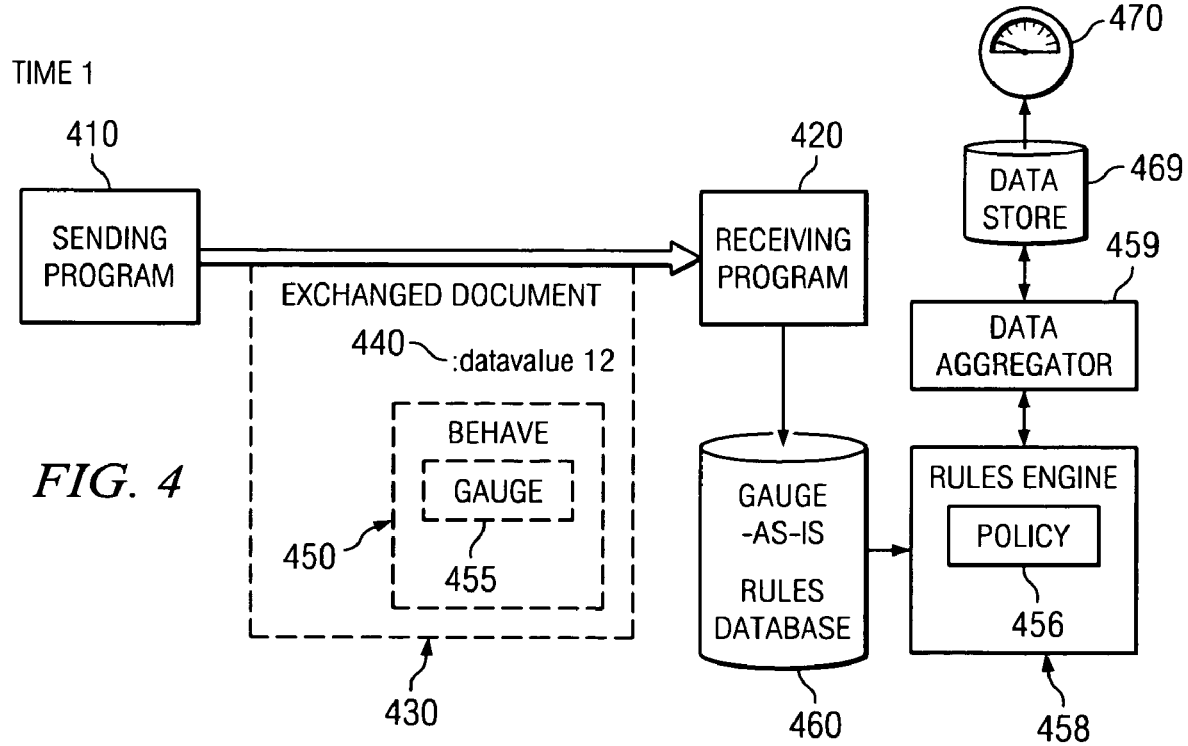
FIG. 4 is an exemplary block diagram illustrating processing of a document containing a behavior tag in accordance with an illustrative embodiment of the present invention.

FIG. 4 is an exemplary block diagram illustrating the transmission of data between a sending and receiving program in accordance with one illustrative embodiment of the present invention. In this illustrative example, data is exchanged between a sending program 410 and receiving program 420 in the form of an exchanged document 430. A data receiver, such as data receiver 306 in FIG. 3, associated with the sending program transmits data and behavior tag(s) to a data receiver, such as data receiver 308 in FIG. 3, associated with receiving program 420. Sending program 410 sends the data and the behavior tag(s) to a receiving application for processing.

The behavior tag(s) and data may be transmitted to receiving program in an exchanged document. In this example, exchanged document 430 contains data element 440 and meta-data behavior tag BEHAV 450, including sub-tag GAUGE 455. Behavior tag and sub-tag "BEHAV GAUGE" 450-455 provides an example of a behavior tag and sub-tag in data that has been modified to include a behavior tag.

Receiving program 420 recognizes behavior tag 450, including sub-tag GAUGE 455. Receiving program 420 takes a set of actions on data element 440 based on a policy 456 containing a set of behavior rules defined for behavior tag 450 and sub-tag 455 provided to receiving program 420 by rules engine 458. The set of behavior rules for policy 456 are stored in rules database 460.

A data aggregator processes the portion of the data using the policy for a particular behavior tag. The set of rules that make up the policy for a behavior tag are provided to data aggregator 459 in the form of a behavior tag definition. The behavior tag definition specifies the operations to be performed on data by the data aggregator.

In this example, data aggregator 459 processes data in accordance with policy 456 for behavior tag 455. Policy 456 for behavior tag 450 indicate that the only operation to be performed on data element 440 is to display the data "as-is" as a numeric value in a gauge type display, such as display 470. The processed data is stored in data store 469 prior to display. Data element is displayed as a numeric value on a gauge type display, such as display 470.

In accordance with one illustrative embodiment, a behavior tag definition is provided to an aggregation program, such as data aggregator 459, as a set of operations tags indicating an operation on a data element. As discussed above, data associated with a behavior tag is processed and/or displayed in accordance with the operations defined for that behavior tag. A behavior tag definition can be comprised of a set of operation tags. Each operation tag indicates an operation to be performed on data. For example, a definition for behavior tag BEHAV GAUGE can be the set of operation tags MIN (minimum), MAX (maximum), AVG (average), and STD (standard deviation). Each operation tag in behavior tag definition specifies an operation to be performed on data associated with that behavior tag. A set of operation tags is defined to mean one or more operation tags.

In accordance with one exemplary embodiment, operation tag MIN indicates an operation to find and display a minimum value; operation tag MAX indicates an operation to find a maximum value; operation tag AVG indicates an operation to find an average value; and operation tag STD indicates an operation to find a standard deviation.

In accordance with an illustrative embodiment of the present invention, each behavior tag has at least one characterization sub-tag. In another illustrative embodiment of the present invention, each characterization sub-tag is associated with one or more operation tag definitions in a rules database.

A rules engine, such as rules engine 458, returns a list of behavior tag definitions to a data aggregator associated with the receiving program. The data aggregator compares each tag definition to an operation to be performed.

Examples of sub-tags and operation tag definitions for sub-tags in accordance with an illustrative embodiment of the present invention are as follows:

GAUGE-MIN, MAX, AVG;
STATE-UP, DOWN;
COUNT-TOT, HI, LOW, LAT;
SAMPLECOUNT-SUM;
PEAK-MAX;
LOW-MIN; and
PDEL-MIN, MAX, SUM.

In these examples, the set of rules for a particular behavior tag are stored as a set of operation tags in a rules engine database table. One column of the database table stores a behavior sub-tag, such as GAUGE. The other column of the table stores an operation for the sub-tag. If a sub-tag has multiple operations, then the sub-tag name is listed in the first column for each sub-tag tag operation.

The set of rules for a behavior tag can be defined in a behavior tag definition that is typed directly into a user interface program and written directly into the database lookup table. In an alternative embodiment, the behavior tag definition can be represented in a definition file. If a definition file is used, it can use the XML markup language or any document structure that relates to a parent entry, such as sub-tag PEAK, behavior with children, such as MAX, operation to be performed on data.

A user can modify the set of rules for a particular behavior tag by providing a sub-tag definition file containing operations tags for the behavior sub-tag to rules engine. The rules engine processes the behavior sub-tag definition file through a behavior update program that parses the definition file and populates a database lookup table for behavior sub-tag operations.

The behavior update program parses a new behavior tag definition and populates a database lookup table to update and/or modify a behavior tag definition. The behavior update program writes data into database lookup table as a key value set. For example, for the behavior tag BEHAV PEAK, the definition files says "BEHAV PEAK: MAX." The program writes into the database lookup table: key=PEAK; action=MAX. When the rules engine processes a BEHAV PEAK behavior tag, the rules engine will provide the operation tag MAX as a behavior tag definition for the behavior tag. In this example, the operation tag MAX in behavior tag definition indicates that a maximum value is to be determined for the data.

If there are multiple operations for a behavior tag definition, behavior update program creates multiple key value pairs in database lookup table. For example, if the behavior tag "BEHAV GAUGE" is given a new behavior tag definition that includes the operations MIN (minimum) and AVG (average), behavior update program includes an entry for GAUGE MIN and an entry for GAUGE AVG in the database lookup table. In other words, behavior update program provides an entry in database lookup table for each operation defined for a particular sub-tag.

The behavior update program can be written in any programming language. The behavior update program can be run on any machine or device, such as the ones depicted in FIG. 1. In one embodiment, the behavior update program runs on a server. The behavior update program is capable of connecting to storage and writing the definition file into a database table.

Figure 5:
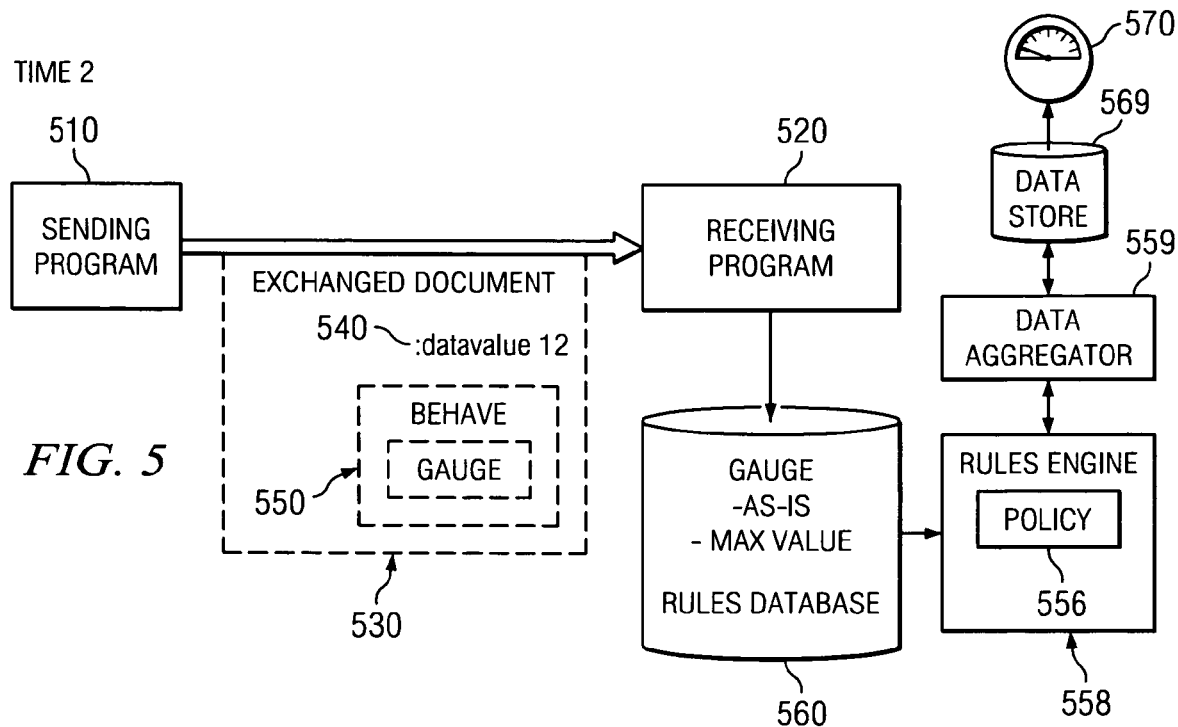
FIG. 5 is another exemplary block diagram illustrating processing of a document containing a behavior tag in accordance with an illustrative embodiment of the present invention.

FIG. 5 is another exemplary block diagram illustrating the transmission of data between a sending and receiving program in accordance with an illustrative embodiment of the present invention. In this illustrative example, data is exchanged between a sending program 510 and receiving program 520 in the form of an exchanged document 530. Exchanged document 530 contains data element 540 and meta-data behavior tag "BEHAV GAUGE" 550. In FIG. 5, reference numbers 520-570 correspond to reference numbers 420-470 in FIG. 4.

In this illustrative example, a new rule has been added to rules database 560 for policy 556 associated with behavior tag "BEHAV GAUGE" 550. A "highest value" or maximum value operation has been added by the addition of a MAX operation to policy 556 for behavior tag 550 in rules database 560.

In response to receiving data element 540 and behavior tag 550, data aggregator 559 requests the set of rules for the behavior tag policy 556 from rules engine 558. Rules engine 558 provides the new policy 556 for behavior tag 550. Data aggregator 559 associated with receiving program 520 processes and stores data in data store 569. The processed data is displayed in accordance with policy 556 for the updated behavior tag definition. The processed data is displayed as an "as-is" value and as a maximum value on a gauge-like display, such as display 570.

The behavior tag definition associated with a behavior tag is user configurable. In one embodiment of the present invention, a user may change a behavior tag definition in rules engine database by editing a definition file for the sub-tag, as discussed above. A definition file can use the XML markup language or any document structure that relates to a parent entry, such as sub-tag PEAK, behavior with children, such as MAX, operation to be performed on data.

A user alters the definition of a behavior sub-tag by adding or deleting tag definitions, as discussed above with regard to behavior rules. For example, a user could add an AVG operation tag definition to a behavior tag definition indicating that an operation to find and display an average value for data will be performed by the data aggregator. Returning to FIG. 5, a MAX operation tag definition has been added to behavior tag definition indicating that an operation to find the highest value will be performed on data associated with the behavior tag 550.

In accordance with the aspects of the present invention, a graphical user interface (GUI), command-line interface, menu-driven interface, or any combination of interface types could be provided to permit a user to modify the rules for a particular behavior tag in accordance with the aspects of the present invention.

Figure 6:
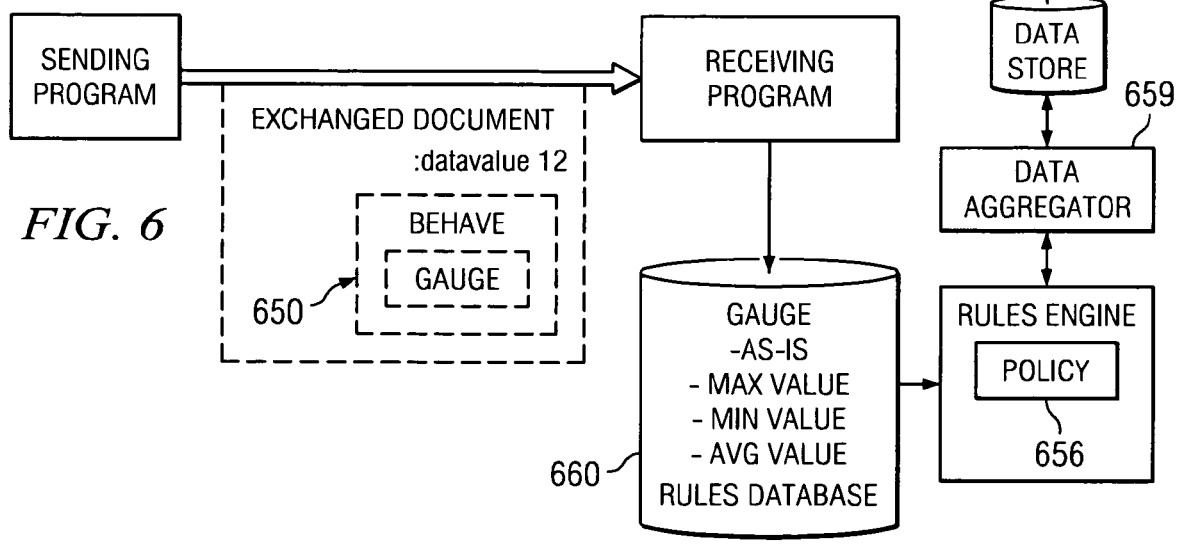
FIG. 6 is another an exemplary block diagram illustrating processing of a document containing a behavior tag in accordance with an illustrative embodiment of the present invention.

FIG. 6 is another exemplary block diagram illustrating the transmission of data between a sending and receiving program in accordance with one embodiment of the present invention. A policy associated with a behavior tag is user configurable. A user can change an existing policy associated with a behavior tag or create a new policy associated with the behavior tag. The new policy can specify a different processing of the portion of data assigned to the behavior tag. The portion of data assigned to the behavior tag will then be processed using the new policy. In FIG. 6, reference numbers 650-670 correspond to reference numbers 550-570 in FIG. 5 and reference numbers 450-470 in FIG. 4.

In this illustrative example, an existing policy for behavior tag is changed to add additional rules for processing data. Rules are added to rules database 660 for the behavior tag 650 policy 656 in accordance with the modified policy. Data is processed by data aggregator 659 based on the new policy 656 for behavior tag "BEHAVE GAUGE" to determine a minimum, maximum, and average value. Processed data is stored in data store 669. The data is displayed in a gauge-type display, such as display 670, in accordance with the updated definition for behavior tag 650. In accordance with an embodiment of the present invention, a user may add as many new rules specifying operations for a sub-tag as desired by the user.

In another exemplary embodiment of the present invention, multiple layers of definition tags may be provided by the rules engine. For example, a BEHAV GAUGE definition tag MATH may be provided by rules engine. The MATH tag may have its own operation tag definition, such as CALC. The CALC definition tag could then be defined to indicate an operation to calculate a value using data. Thus, multiple layers of abstraction may be created by utilizing multiple layers of definition tags with the rules engine. Each layer of definition tag may be defined as another definition tag to create as many layers of abstraction as is desired by a user.

Figure 7:
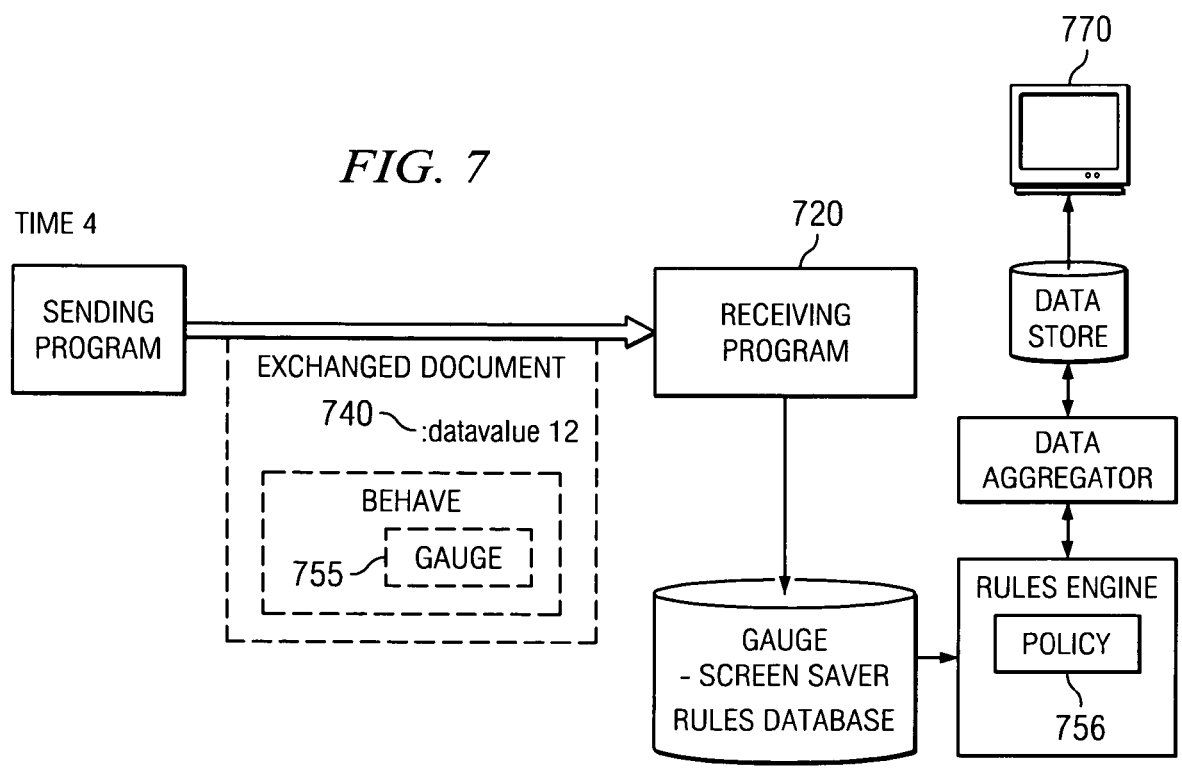
FIG. 7 is another exemplary block diagram illustrating processing of a document containing a behavior tag in accordance with an illustrative embodiment of the present invention.

FIG. 7 is another exemplary block diagram illustrating the transmission of data between a sending and receiving program in accordance with one embodiment of the present invention. In this illustrative embodiment of the present invention, user redefined the definition of sub-tag GAUGE 755 in policy 756 for receiving program 720 such that numeric value data element 740 received by receiving program 720 selects a particular screen saver to be displayed to user on a display, such as display 770. In FIG. 7, reference numbers 720-770 correspond to reference numbers 620-670 in FIG. 6, reference numbers 520-570 in FIG. 5 and reference numbers 420-470 in FIG. 4.

Figure 8:
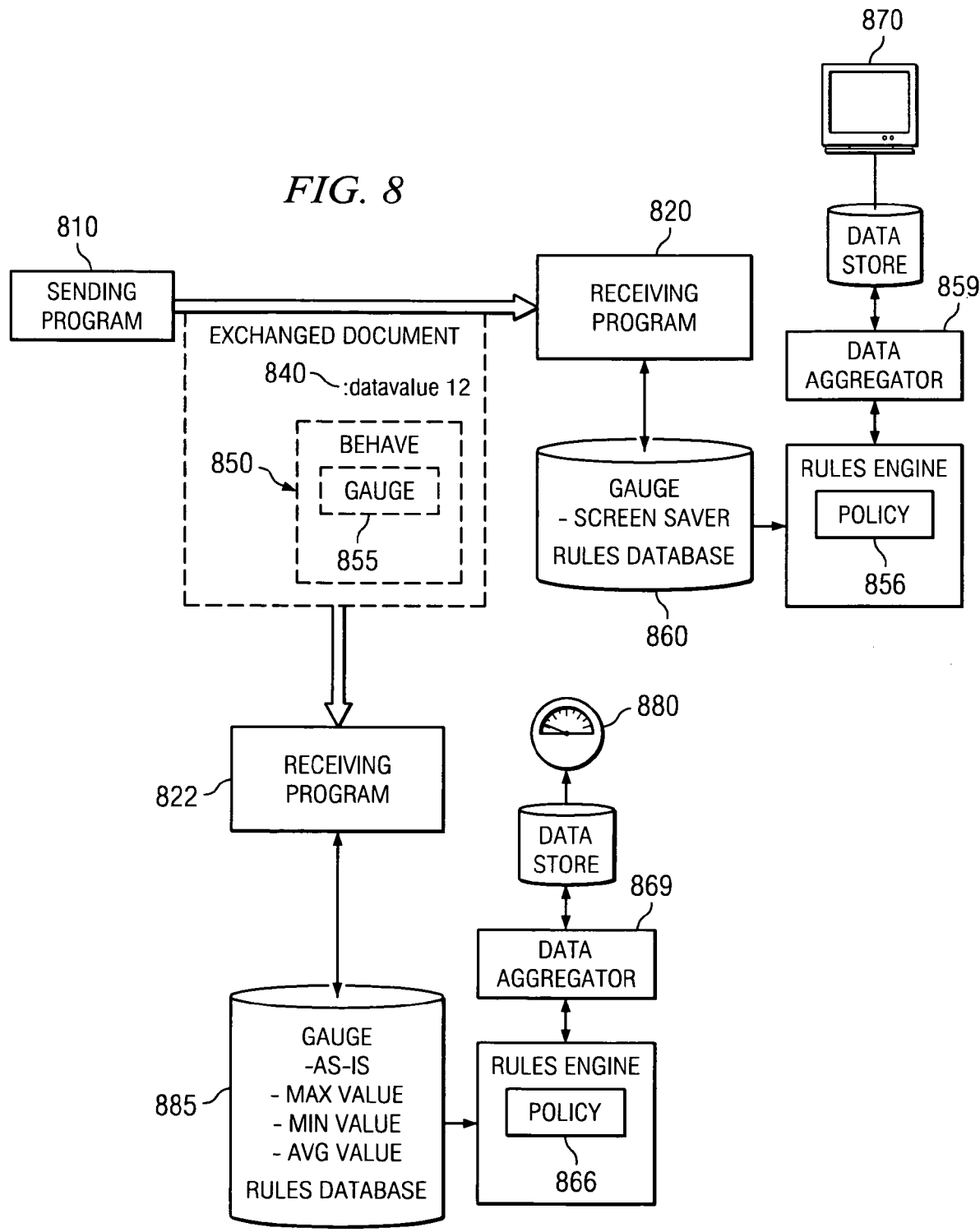
FIG. 8 is an exemplary block diagram illustrating the transmission of data between a sending program and multiple receiving programs in accordance with an illustrative embodiment of the present invention.

FIG. 8 is an exemplary block diagram illustrating the transmission of data between a sending program and multiple receiving programs in accordance with one embodiment of the present invention. Receiving programs 820 and 822 receive the same data element 840 and the same meta-data behavior tag 850 and sub-tag 855. Data element 840 is processed and displayed in accordance with different policies 856 and 866 for the behavior sub-tag 855. In other words, sending the data and the behavior tag to a second receiving application, such as receiving program 822, where the second receiving application associates a different policy to the behavior tag, results in the second receiving application processing and/or displaying the data in accordance with a different policy than the first receiving application, such as receiving program 822.

For example, data aggregator 859 associated with receiving program 820 processes data for display as a screen saver on a display, such as display 870, based on the definition for behavior sub-tag 855 in rules database 860 for receiving program 820. Second receiving program 822 receives the same data element 840 and meta-data behavior tag 850 and sub-tag 855 from the same sending program 810. Data aggregator 869 associated with second receiving program 822 processes data for display as a gauge type display, such as display 880, in accordance with rules in rules database 885 for behavior tag 850.

In accordance with the aspects of the present invention, data aggregators for different receiving programs receiving the same data and the same meta-data sub-tag can process data differently and display different results based on a different set of rules in the rules database defining the behavior of the behavior tag. In other words, the same data and behavior tag can be sent to multiple data receivers where the same data will be processed and displayed differently based on different policies for the behavior tag.

FIG. 9 is a flowchart outlining an exemplary operation of the present invention when data provider processes data in accordance with an embodiment of the present invention. The process is implemented by data provider 304 in FIG. 3.

Data provider reads data from a system that data provider is monitoring (step 902). Data provider adds behavior tags to data to classify data collected by data provider (step 904). A behavior tag and one or more sub-tags can be added to each data element. Data provider sends data and added behavior tags to data sender for transmission to a data receiver (step 906) with the process terminating thereafter.

FIG. 10 is a flowchart outlining an exemplary operation of the present invention when data receiver processes data in accordance with an exemplary embodiment of the present invention. The process is implemented by data receiver 308 in FIG. 3.

Data receiver receives data and behavior tags from data sender (step 1010). Data receiver can separate data by behavior, if necessary (step 1020). Data receiver writes data and behavior tags to a database table (step 1030) with the process terminating thereafter.

FIG. 11 is a flowchart outlining an exemplary operation of the present invention when data aggregator processes data in accordance with an illustrative embodiment of the present invention. In this example, the process is implemented by data aggregator 312 in FIG. 3.

The data aggregator determines if there is new data in the database (step 1110). If there is new data in the database, the data aggregator reads the data and creates a list of data elements and behavior tags in data (step 1120). The data aggregator passes behavior tag(s) to rules engine (step 1130) and requests a behavior tag definition from the rules engine (step 1140). The behavior tag definition defines operations to be performed on data associated with the behavior tag.

The data aggregator receives a list of definitions for the behavior sub-tag (step 1150) from rules engine. The data aggregator aggregates data based on the set of rules for the behavior tag definition provided by the rules engine (step 1160). For example, rules for the behavior tag may specify that data may be aggregated or summarized based on an hourly, weekly, monthly, quarterly, or yearly time interval.

Referring back to step 1110, if no new data is detected in the rules database, the data aggregator determines if a new behavior definition has been received for data in the database (step 1170). A new behavior definition for data is provided when user creates a new behavior definition or modifies an existing behavior tag definition. In no new data definition for a behavior tag has been received, the process returns to step 1110. If a new data definition for a particular behavior tag is received, the data aggregator processes data for the particular behavior sub-tag based on the new behavior definition for behavior tag (step 1160) with the process terminating thereafter.

FIG. 12 is an exemplary illustration of pseudocode logic in a rules process in accordance with an embodiment of the present invention in which the data aggregator detects new data in the database and contacts the rules engine to request a rules definition for a behavior sub-tag for the new data. In this example, code 1210 illustrates a data aggregator checking database table for new data and building a list of data elements and behavior tags in the new data. Pseudocode 1220 illustrates a data aggregator requesting a policy for behavior tag from the rules engine and processing data in accordance with the policy received from rules engine.

FIG. 13 depicts an example of pseudocode logic in accordance with an illustrative embodiment of the present invention. In this example, code 1300 is an example of code that may be executed in a rules engine that received data from a data aggregator and provides a tempered definition for behavior tag to the data aggregator in response.

FIG. 14 is an exemplary illustration of pseudocode logic in a rules process when a behavior tag definition is changed in accordance with an illustrative embodiment of the present invention. In this example, code 1400 is an example of code that may be executed in a rules engine that receives a behavior tag definition change from a user. The rules engine contacts the data aggregator and provides the data aggregator with new behavior tag definition(s) when the rules engine receives a behavior tag definition change.

In accordance with the aspects of the present invention, behavior tags describe the behavior of a data element rather than just specifying a format of the data element. A user can add a new data behavior or modify an existing data behavior by modifying the rules that describe data behavior rather than adding a new meta-data tag and modifying the sending program and receiving program to handle the new data tag. Moreover, receiving programs can understand and process data at significantly more complex levels by modifying the rules that describe data behavior without altering the content of the exchanged document.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for mathematically aggregating data, the computer implemented method comprising:
   generating the data by collecting numeric data by a data provider of the data;
   assigning a behavior tag to a portion of the data by the data provider of the data;
   sending, by the data provider, the data and the behavior tag to a receiving application for mathematically aggregating the data;
   receiving the data and the behavior tag by the receiving application and storing the data and the behavior tag in a database by the receiving application to form modified data;
   responsive to the modified data being stored in the database, parsing the modified data for the behavior tag assigned to the portion of the data, wherein the behavior tag includes a plurality of sub-tags each having a respective portion of data assigned thereto;
   responsive to detecting the behavior tag, determining if a policy is associated with respective ones of the plurality of sub-tags of the behavior tag, wherein each policy defines how the respective portion of data assigned to a respective one of the plurality of sub-tags is to be mathematically aggregated;
   mathematically aggregating the portion of data using at least one associated policy that defines mathematical operations to be performed on the portion of the data;
   determining if a new behavior definition for a given one of the plurality of sub-tags has been received; and
   responsive to the new behavior definition being received, mathematically aggregating the portion of data using another policy associated with the new behavior definition, wherein the another policy defines different mathematical operations to be performed on the portion of data.

2. The computer implemented method of claim 1 wherein the policy is user configurable such that a user augments an existing behavior tag definition to include an additional operational tag for the existing behavior tag definition such that an additional mathematical operation is subsequently performed by a data aggregator when encountering an associated behavior tag that the existing behavior tag definition is associated with.

3. The computer implemented method of claim 1 further comprising:
   associating a new policy to the behavior tag, wherein the new policy specifies a different aggregation of the portion of the data assigned to the behavior tag;
   mathematically aggregating the portion of the data using the new policy; and
   storing the mathematically aggregated portion of the data in a data store.

4. The computer implemented method of claim 1 further comprising:
   sending the data and behavior tag to a second receiving application, wherein the second receiving application associates a different policy to the behavior tag, and wherein the second receiving application mathematically aggregates the data in accordance with the different policy.

5. The computer implemented method of claim 1 further comprising:
   creating a tempered list of behavior tag definitions which define behaviors for a subset of behavior tags created from a set of all behavior tags encountered for a given document being processed.

6. The method of claim 1, wherein the data and the behavior tag are stored in one of a plurality of tables of the database based upon a type of the behavior tag.

7. The method of claim 1, wherein the policy comprises a plurality of different mathematical operations to be performed on the portion of data associated with the behavior tag.

8. The method of claim 1, wherein the data and the behavior tag comprising the plurality of sub-tags are all included in a document that is sent to the receiving application, and wherein at least one of the sub-tags is associated with a plurality of operation tag definitions.

9. The method of claim 2, wherein the existing behavior tag definition is maintained in a database lookup table as a key value set.

10. A computer program product comprising a computer-readable recordable storage medium, said storage medium comprising program code for accomplishing the method of claim 1.

11. The computer program product of claim 10 further comprising program code for:

associating a new policy to the behavior tag, wherein the new policy specifies a different aggregation of the portion of the data assigned to the behavior tag; and mathematically aggregating the portion of the data using the new policy.

12. The computer program product of claim 10, wherein the policy comprises a plurality of different mathematical operations to be performed on the portion of data associated with the behavior tag.

13. The computer program product of claim 10, wherein the data and the behavior tag comprising the plurality of sub-tags are all included in a document that is sent to the receiving application, and wherein at least one of the sub-tags is associated with a plurality of operation tag definitions.

14. A data processing system for aggregating data, said data processing system comprising a data processor and a memory storage device operatively coupled to the data processor, and further comprising:

a data provider of the data processing system that collects data, wherein the data provider assigns a behavior tag to a portion of the data in accordance with a data template to form modified data, and wherein the behavior tag includes a sub-tag;

a data sender of the data processing system, wherein the data sender sends the modified data to a data receiver program that writes the modified data into a database;

a data aggregator of the data processing system, wherein the data aggregator reads the modified data from the database and parses the modified data for the behavior tag assigned to the portion of the data; and a rules engine of the data processing system wherein, responsive to data aggregator detecting the behavior tag and contacting the rules engine, the rules engine determines if a policy is associated with the behavior tag and if so, provides the policy to the data aggregator, and wherein the policy defines how the portion of the data assigned to the behavior tag is to be aggregated by the data aggregator; and wherein the data aggregator aggregates the portion of the data using the policy to perform mathematical operations on the portion of the data associated with the behavior tag;

wherein the data aggregator provides the rules engine with the behavior tag and other system information associated with the data processing system, and wherein the rules engine creates a tempered list of behavior tag definitions based on the other system information to form the policy.

15. The system of claim 14 wherein the policy is user configurable such that an existing behavior tag definition is augmentable by a user to include an additional operational tag for the existing behavior tag definition such that an additional mathematical operation is subsequently performed by the data aggregator when encountering an associated behavior tag that the existing behavior tag definition is associated with.

16. The system of claim 14 in combination with a second system for aggregating data, wherein the second system comprises:

a second data receiver program that also receives the modified data and writes the modified data into a second database;

a second data aggregator, wherein the second data aggregator reads the modified data from the second database and parses the modified data for the behavior tag assigned to the portion of the data; and a second rules engine wherein, responsive to second data aggregator detecting the behavior tag and contacting the second rules engine, the second rules engine determines if a second policy is associated with the behavior tag, wherein the second policy defines how the portion of the data assigned to the behavior tag is to be aggregated by the second data aggregator, and wherein the second data aggregator aggregates the portion of the data using the second policy to perform mathematical operations on the portion of the data associated with the behavior tag;

wherein the policy and the second policy are different, such that data receiver program and the second data receiver program both receive the modified data and aggregate the portion of the data in a different manner according to the policy and the second policy, respectively.

17. The system of claim 14, wherein the other system information comprises at least one of an identification of an amount of data included in the portion of data and a time when the portion of data should be aggregated by the rules engine.

18. The system of claim 14, wherein the policy comprises a plurality of different mathematical operations to be performed on the portion of data associated with the behavior tag, and wherein the tempered list is a subset of the plurality of different mathematical operations that takes into account an operational configuration of the data aggregator.

19. The system of claim 14, wherein the data and the behavior tag comprising the plurality of sub-tags are all included in a document that is sent to the receiving application, and wherein at least one of the sub-tags is associated with a plurality of operation tag definitions.

20. The system of claim 15, wherein the existing behavior tag definition is maintained in a database lookup table as a key value set.

* * * * *

UNITED STATES PATENT AND TRADEMARK OFFICE
CERTIFICATE OF CORRECTION

PATENT NO. : 7,668,857 B2  Page 1 of 1
APPLICATION NO. : 11/268989
DATED : February 23, 2010
INVENTOR(S) : Cook et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 359 days.

Signed and Sealed this

Seventh Day of December, 2010

David J. Kappos
*Director of the United States Patent and Trademark Office*